United States Patent
Mossberg et al.

(10) Patent No.: US 7,333,692 B1
(45) Date of Patent: Feb. 19, 2008

(54) OPTICAL WAVEGUIDE ASSEMBLED WITH AN OPTICAL SUBUNIT HAVING A DIFFRACTIVE ELEMENT SET AND AN OPTICAL COMPONENT

(75) Inventors: Thomas W. Mossberg, Eugene, OR (US); Christoph M. Greiner, Eugene, OR (US); Dmitri Iazikov, Springfield, OR (US)

(73) Assignee: LightSmyth Technologies Inc., Eugene, OR (US)

(*) Notice: Subject to any disclaimer, the term of this patent is extended or adjusted under 35 U.S.C. 154(b) by 0 days.

(21) Appl. No.: 11/552,501

(22) Filed: Oct. 24, 2006

Related U.S. Application Data

(60) Provisional application No. 60/730,233, filed on Oct. 24, 2005.

(51) Int. Cl.
*G02B 6/34* (2006.01)
(52) U.S. Cl. .................. 385/37; 385/15; 385/30; 385/31
(58) Field of Classification Search ............ 385/15, 385/30, 31, 37
See application file for complete search history.

(56) References Cited

U.S. PATENT DOCUMENTS 5,206,922 A * 4/1993 Westland et al. .............. 385/5
5,239,598 A * 8/1993 Wight et al. .................. 385/8

* cited by examiner

*Primary Examiner*—Jennifer Doan
(74) *Attorney, Agent, or Firm*—David S. Alavi

(57) ABSTRACT

An apparatus comprises an optical transmission element, a diffractive element set formed in or on the transmission element, and an optical component. The diffractive element set is positioned to enable spatial overlap of diffractive elements and an evanescent optical signal propagating in a suitably positioned optical waveguide. The diffractive elements are arranged to establish optical coupling between respective optical signals propagating within the transmission element and the optical waveguide. The optical component is arranged to launch or receive the optical signal propagating within the transmission element. The diffractive element set is arranged so that the optical signal in waveguide is successively incident on the diffractive elements. The optical apparatus can further include the optical waveguide, with the optical waveguide and the transmission element comprising discrete, assembled subunits.

63 Claims, 8 Drawing Sheets

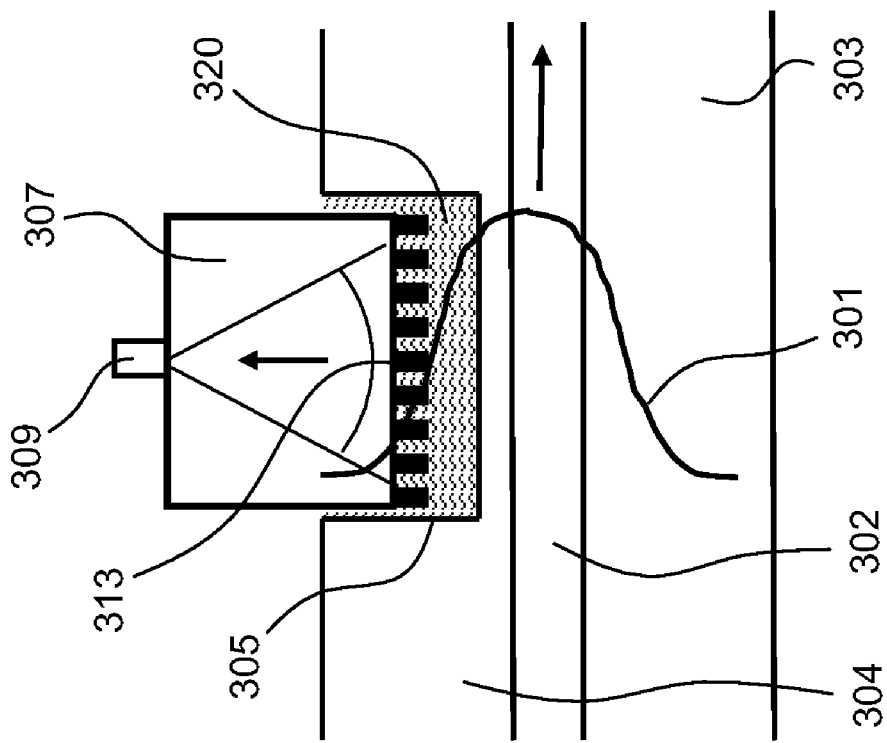
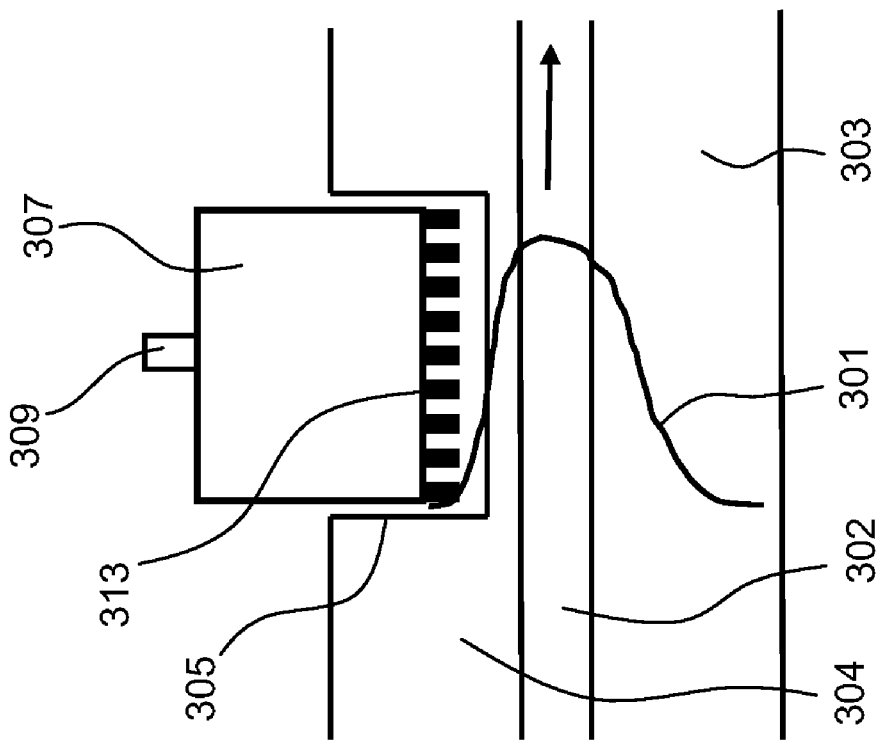

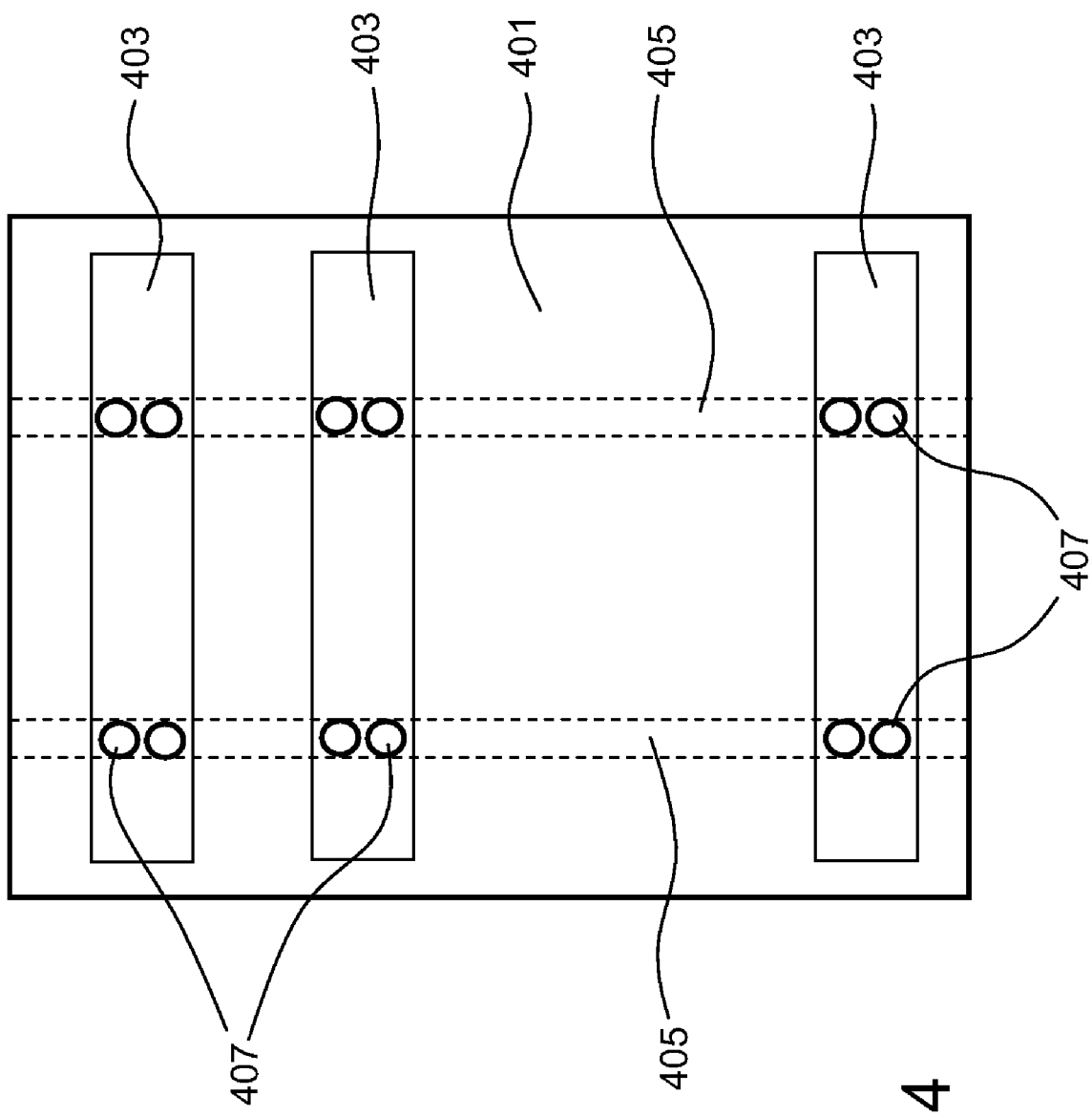

OPTICAL WAVEGUIDE ASSEMBLED WITH AN OPTICAL SUBUNIT HAVING A DIFFRACTIVE ELEMENT SET AND AN OPTICAL COMPONENT

BENEFIT CLAIMS TO RELATED APPLICATIONS

This application claims benefit of U.S. provisional App. No. 60/730,233 filed Oct. 24, 2005, said provisional application being incorporated by reference as if fully set forth herein.

BACKGROUND

The field of the present invention relates to assembled optical subunits coupled by a set of diffractive elements. In particular, an optical subunit including a diffractive element set and an optical component, and its assembly with and optical coupling to an optical waveguide, is disclosed herein.

Various embodiments, implementations, and adaptations of diffractive element sets are disclosed in:

application Ser. No. 11/548,279 filed Oct. 10, 2006 (now U.S. Pat. No. 7,292,755);
application Ser. No. 11/532,532 filed Sep. 17, 2006 (now U.S. Pat. No. 7,190,859);
application Ser. No. 11/531,274 filed Sep. 12, 2006;
application Ser. No. 11/423,856 filed Jun. 13, 2006 (now U.S. Pat. No. 7,224,867);
application Ser. No. 11/277,491 filed Mar. 25, 2006 (now U.S. Pat. No. 7,190,856);
application Ser. No. 11/277,423 filed Mar. 24, 2005;
application Ser. No. 11/383,494 filed May 16, 2006 (now U.S. Pat. No. 7,203,401);
application Ser. No. 11/376,714 filed Mar. 14, 2006;
application Ser. No. 11/371,339 filed Mar. 7, 2006;
application Ser. No. 11/361,407 filed Feb. 23, 2006 (now U.S. Pat. No. 7,116,453);
application Ser. No. 11/334,039 filed Jan. 17, 2006;
application Ser. No. 11/298,290 filed Dec. 9, 2005;
application Ser. No. 11/280,876 filed Nov. 15, 2005;
application Ser. No. 11/239,540 filed Sep. 28, 2005 (now U.S. Pat. No. 7,009,743);
application Ser. No. 11/213,345 filed Aug. 25, 2005 (now U.S. Pat. No. 7,120,334);
application Ser. No. 11/210,439 filed Aug. 23, 2005;
application Ser. No. 11/155,327 filed Jun. 16, 2005 (now U.S. Pat. No. 7,190,858);
application Ser. No. 11/076,251 filed Mar. 8, 2005 (now U.S. Pat. No. 7,062,128);
application Ser. No. 11/062,109 filed Feb. 17, 2005 (now U.S. Pat. No. 7,181,103);
application Ser. No. 11/055,559 filed Feb. 9, 2005 (now U.S. Pat. No. 7,123,794);
application Ser. No. 11/021,549 filed Dec. 23, 2004 (now U.S. Pat. No. 7,260,290);
application Ser. No. 10/998,185 filed Nov. 26, 2004 (now U.S. Pat. No. 6,993,223);
application Ser. No. 10/989,244 filed Nov. 15, 2004 (now U.S. Pat. No. 6,961,491);
application Ser. No. 10/989,236 filed Nov. 15, 2004 (now U.S. Pat. No. 6,965,716);
application Ser. No. 10/923,455 filed Aug. 21, 2004 (now U.S. Pat. No. 7,054,517);
application Ser. No. 10/898,527 filed Jul. 22, 2004 (now U.S. Pat. No. 7,194,164);
application Ser. No. 10/857,987 filed May 29, 2004 (now U.S. Pat. No. 6,990,276);
application Ser. No. 10/842,790 filed May 11, 2004 (now U.S. Pat. No. 6,987,911);
application Ser. No. 10/798,089 filed Mar. 10, 2004 (now U.S. Pat. No. 6,823,115);
application Ser. No. 10/794,634 filed Mar. 5, 2004 (now U.S. Pat. No. 6,985,656);
application Ser. No. 10/740,194 filed Dec. 17, 2003 (now U.S. Pat. No. 7,224,855);
application Ser. No. 10/653,876 filed Sep. 2, 2003 (now U.S. Pat. No. 6,829,417);
application Ser. No. 10/602,327 filed Jun. 23, 2003 (now U.S. Pat. No. 6,859,318);
application Ser. No. 10/229,444 filed Aug. 27, 2002 (now U.S. Pat. No. 6,678,429);
application Ser. No. 09/843,597 filed Apr. 26, 2001 (now U.S. Pat. No. 6,965,464); and
application Ser. No. 09/811,081 filed Mar. 16, 2001 (now U.S. Pat. No. 6,879,441).

Each of said applications and patents is hereby incorporated by reference as if fully set forth herein. A publication entitled "Planar holographic optical processing devices" (T. W. Mossberg, Opt. Lett. 26 414 (2001)) is also incorporated by reference as if fully set forth herein.

For one or more of the references incorporated hereinabove, it may be the case that the devices, structures, embodiments, implementations, adaptations, procedures, or techniques disclosed therein may be employed, within the scope of the present disclosure or appended claims, for implementing an optical subunit (including a diffractive element set and an optical component) assembled with and optically coupled to an optical waveguide.

SUMMARY

An optical apparatus comprises: an optical transmission element substantially transparent over an operational wavelength range; a set of diffractive elements formed in or on the transmission element; and an optical component. The diffractive element set is positioned in or on the transmission element so as to enable at least partial spatial overlap of diffractive elements of the set and an evanescent portion of an optical signal propagating in an optical waveguide suitably positioned relative to the transmission element. The diffractive elements of the set are arranged so as to establish optical coupling between an optical signal propagating within the transmission element and the optical signal propagating in the suitably positioned optical waveguide. The optical component is arranged to launch or receive the optical signal propagating within the transmission element. The diffractive elements of the set are arranged so that the optical signal propagating in the suitably positioned optical waveguide is successively incident on the diffractive elements of the set. The optical apparatus can further include the optical waveguide arranged so as to provide the evanescent portion of the optical signal propagating therein and suitably positioned so as to enable at least partial spatial overlap of diffractive elements of the set and the evanescent portion of the optical signal propagating in the optical waveguide. The optical waveguide and the transmission element comprise discrete, assembled subunits.

Objects and advantages pertaining to an optical subunit (including a diffractive element set and an optical component) assembled with and optically coupled to an optical waveguide may become apparent upon referring to the disclosed exemplary embodiments as illustrated in the drawings and disclosed in the following written description and/or claims.

BRIEF DESCRIPTION OF THE DRAWINGS

FIGS. 3A and 3B illustrates schematically an optical waveguide, an optical subunit assembled therewith, and a liquid or gel optical medium between them.

FIG. 4 illustrates schematically multiple optical subunits assembled onto an optical waveguide.

Figure 1:
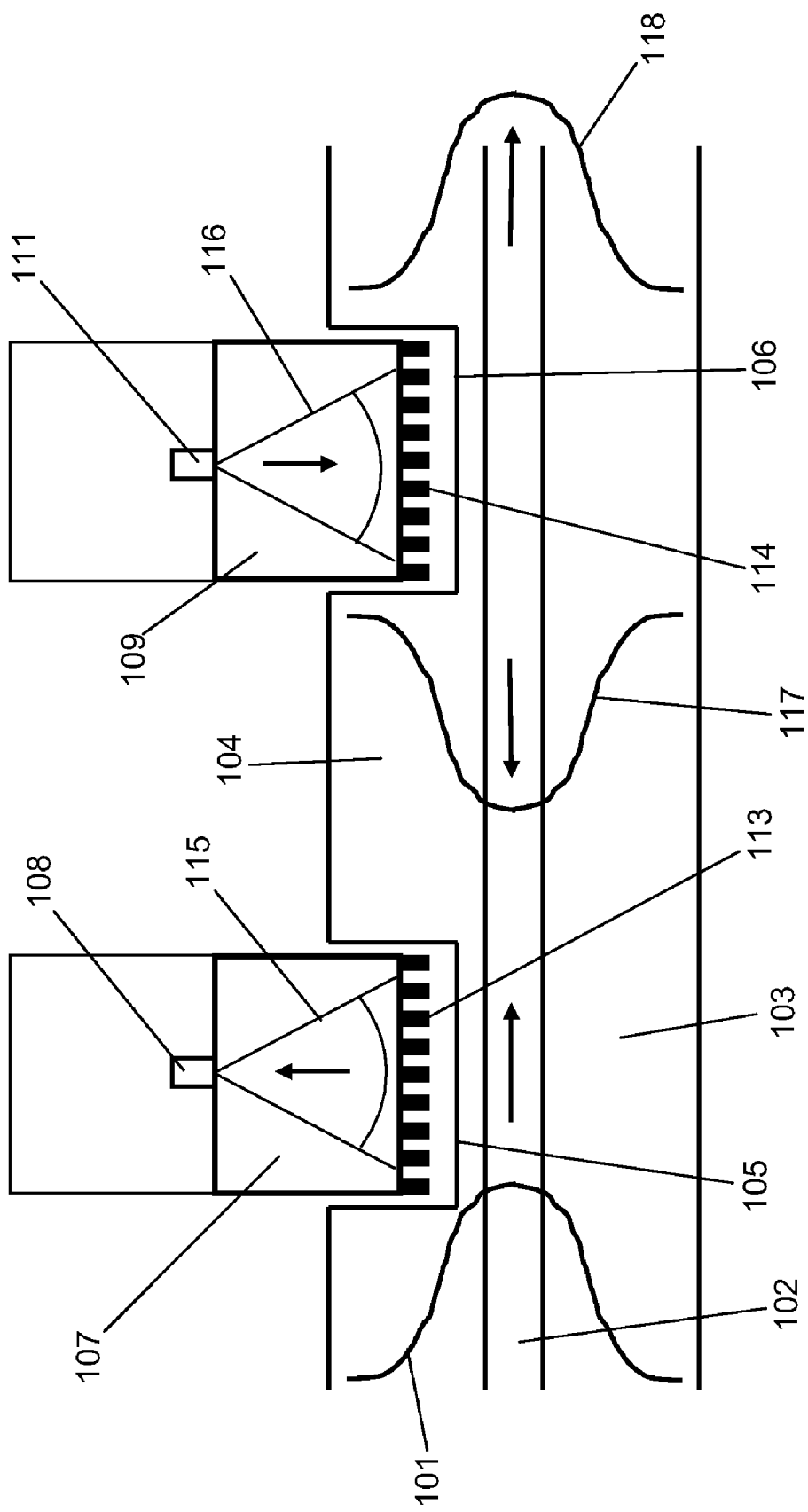
FIG. 1 illustrates schematically an optical waveguide and optical subunits assembled therewith.

In the Figures, typically only a few diffractive elements are shown out of an entire diffractive element set, which may contain anywhere from a few, dozens, hundreds, or even thousands of diffractive elements. The Figures may illustrate the transmission element, diffractive element set, optical device, or optical waveguide schematically and therefore may not show all structures in their proper shape or proportions. The lines or curves representing the diffractive elements, or the contours defining them, do not necessarily represent their actual shapes. In particular, straight lines in some of the Figures may in fact represent elements or contours that may be curved in actual devices, and vice versa. In many of the Figures, the diffractive element set is shown in cross section.

The embodiments shown in the Figures are exemplary, and should not be construed as limiting the scope of the present disclosure or appended claims.

DETAILED DESCRIPTION OF EMBODIMENTS

An optical apparatus according to the present disclosure can include an optical transmission element, having at least one set of diffractive elements, assembled with an optical waveguide. The diffractive element set serves to establish optical coupling between: (i) an optical signal propagating within the transmission element (to or from an optical component or optical port), and (ii) an optical signal propagating in the optical waveguide.

The optical waveguide can comprise a planar optical waveguide substantially confining in at least one transverse spatial dimension optical signals propagating therein. A planar optical waveguide is generally formed on or from a substantially planar substrate of some sort, which may be substantially flat or may be somewhat curved, bent, or deformed. The confined optical signals typically propagate as transverse optical modes supported or guided by the planar waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides. More generally, the adaptations disclosed or claimed herein may be implemented in any guided-wave optical structure, including grating-like structures. The disclosed adaptations may be applied to channel, slab, rib, fiber (including tapered, side-etched, or side-polished fiber), and other guided-wave optical structures known in the art. In the present disclosure, planar waveguides are specifically referred to for concreteness only, and the various exemplary embodiments described herein may be implemented in other guided-wave optical structures as well.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) The indices $n_1$, $n_2$, or $n_{core}$ may be spatially substantially uniform over the planar waveguide, or may spatially vary over the extent of the planar waveguide. The core or cladding(s) may comprise multiple materials having different indices. A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons. A planar waveguide typically supports or guides one or more optical modes characterized by their respective amplitude variations along the confined dimension.

The set of diffractive elements of the optical transmission element may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). The diffracting regions of each diffractive element of the set typically comprises some suitable alteration of the transmission element (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. It should be noted that the terms "diffractive contour"

and "diffractive element" are sometimes used interchangeably in the present disclosure. Implementation of a diffractive element with respect to its virtual contour may be achieved in a variety of ways, including those disclosed in the references incorporated herein. The relative spatial arrangement of the diffractive elements of the set (e.g. longitudinal spacing along the direction of propagation of the optical signal propagating in the optical waveguide), and the relative amplitude diffracted from each diffractive element of the set, yield desired spatial, spectral, and/or temporal characteristics for the overall diffracted optical signal routed between the optical waveguide and the transmission element. It should be noted that the optical signal propagating within the transmission element can be defined structurally (for example, by an aperture, waveguide, fiber, lens, or other optical component) or functionally (for example, by a spatial location, convergence, divergence, collimation, or propagation direction).

The diffractive elements of the set (or equivalently, their corresponding contours) are spatially arranged with respect to one another so that the corresponding portions of the optical signal diffracted by each element interfere with one another so as to impart desired spatial, spectral, or temporal characteristics onto the portion of the optical signal collectively diffracted from the set of diffractive elements and coupled between the optical waveguide and the transmission element. The diffractive elements in the set are arranged so that the optical signal propagating in the optical waveguide is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal (even at high angles-of-incidence), and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

As set forth in prior-filed co-pending application Ser. No. 10/998,185 (incorporated hereinabove), diffracting regions of a diffractive element set may be distributed over one or more spatial regions of the optical element, for facilitating placement of multiple diffractive element sets in a single optical element (referred to as interleaving the multiple diffractive element sets). These spatial regions may be positioned and arranged so as to impart desired spatial, spectral, or temporal characteristics onto the corresponding routed portions of an incident optical signal. Such arrangement may include an optical signal being successively incident on multiple spatial regions of a diffractive element set, with "successively incident" defined as set forth hereinabove. The word "primitive" may be used to designate one diffractive element set among multiple diffractive element sets in a single optical element (e.g., a single optical device may include multiple "primitive programmed holographic structures").

A given set of diffractive elements can provide dual functionality, spatially routing or redirecting a diffracted portion of an optical signal, while at the same time acting to impart a spectral/temporal transfer function onto the diffracted portion of an input optical signal to yield an output optical signal. The diffractive elements may be designed so as to provide optimal routing, imaging, or focusing of the coupled optical signals, thus reducing or minimizing insertion loss (at least with respect to contour shape). Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references incorporated herein. The following are exemplary only, and are not intended to be exhaustive.

Diffractive elements may be formed on the surface of or within an optical transmission element. Diffractive elements may be formed lithographically, or may be formed by projecting ultraviolet light or other suitable radiation through an amplitude and/or phase mask onto the transmission element (referred to herein as external photoexposure) so as to create an interference pattern within the transmission element (fabricated at least in part with suitably sensitive material) whose fringe contours match 11 the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the transmission element followed by optical exposure to create diffractive elements on or in the transmission element. The optical or UV source used to write the diffractive elements in this case should have a coherence length comparable or longer than the distance from the stamped phase mask to the deepest portion of the diffractive element set. Stamping of the phase mask directly on the device may simplify alignment of diffractive elements with ports or other optical components, particularly when those components may be formed or aligned in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of optical materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. For example, each diffractive element contour can be optimized to couple the optical signals in a phase coherent manner. Inputs to the design include the detailed spatial and spectral (and perhaps also temporal) properties of the optical signals to be coupled. Standard ray tracing approaches to optical element design may provide a diffractive contour at each optical distance into the transmission element that will provide an optimal imaging of the optical signals. Simple curves (e.g. conic sections) may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references incorporated hereinabove).

An alternative approach to designing the diffractive element contours for a diffractive element set is to calculate interference patterns between simulated optical signals at a desired wavelength and with desired spectra and/or waveforms. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms (explicitly time-dependent or continuous-wave), with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired optical signal beams. As in traditional holography, the input and output recording beams (same wavelength as operational signal beams of the envisioned device) are overlapped as they propagate in the transmission element (referred to herein as internal photoexposure), thereby recording in the transmission element an interference pattern. Subsequently the photosensitive material is developed and, if necessary, a cladding may be deposited or attached by other means.

The phrase "operationally acceptable" appears herein describing levels of various performance parameters of transmission elements and diffractive element sets thereof and optical waveguides coupled thereto. Such parameters may include optical coupling coefficient (equivalently, optical coupling efficiency), diffraction efficiency, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefor vary within a given class of devices depending on such constraints and/or requirements. For example, a lower optical coupling efficiency may be an acceptable trade-off for achieving lower device fabrication costs in some instances, while higher optical coupling may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially eliminate", "substantially spatial-mode-matched", "so as to substantially avoid undesirable optical coupling", and so on as used herein shall be construed in light of this notion of "operationally acceptable" performance.

In the present disclosure are disclosed methods for designing and fabricating diffractive element sets as well as a broad range of diffractive element set geometries. Diffractive element sets designed according to the disclosed methods may efficiently map or couple virtually any input optical wavefront into any desired output optical wavefront, whether the input and output signals propagate in the same, opposite, or in angled directions, whether the input and output ports or sources are spatially extended or point-like, or whether the input-to-output mapping or coupling occurs under conditions wherein a paraxial approximation would be appropriate. In order to achieve optimal or near-optimal mapping or coupling of input and output optical signal modes, the virtual contours defining the diffractive elements are typically complicated and may be calculated by computation of interference between simulated optical fields representing the input and output optical signal beams that the diffractive element set is intended to couple.

The diffractive element sets (also referred to as distributed optical structures) designed as disclosed herein may provide substantially full waveform reconstruction and/or manipulation of input fields. Such may be achieved under conditions (e.g. non-paraxial limit or extended optical sources) where simple imaging structures (e.g. conic sections) may not provide sufficiently optimized mapping or coupling, and may enable substantially optimized beam routing or highly efficient coupling to various output media (e.g. fiber or channel waveguides). Such waveform control may also be employed in cascading signals through multiple processing diffractive element sets. The diffractive element sets disclosed herein may also enable beam mapping or coupling geometries in slab waveguides such as: acute-, right-, or obtuse-angle bends; forward-focusing or relaying structures; or out-of-plane bends. Diffractive element sets designed as disclosed herein may also enable high-fidelity mapping of spatially extended optical sources (i.e. non-paraxial or non-point-like), or may enable novel beam mapping or coupling functions, such as efficiently converting one mode into another one of different size or profile. Diffractive element sets designed as disclosed herein may be employed in a photonic signal transport structure to provide optical signal routing between multiple sources and receivers without restrictions imposed by signal overlap or intersection. Such a photonic transport layer may provide a basis for on-chip or inter-chip signal transmission in an electronic circuit environment, for example.

The Figures illustrate schematically various exemplary embodiments that include one or more optical subunits each assembled with and optically coupled to an optical waveguide. The optical waveguide also can be referred to as an optical backplane, an optical bus, or an optical motherboard. The optical subunit also can be referred to as an optical daughterboard, an optical card, or an optical expansion card. Other equivalent terminology can be employed, including terms used in the field of electronics or computer architecture. The optical waveguide typically comprises one or more core regions or layers (also referred to as guiding regions or layers) and cladding regions or layers. The optical waveguide can comprise a channel waveguide, a rib waveguide, a slab waveguide, an optical fiber, or other so-called guided-wave optical structures. An array of such structures can be employed. The waveguide may be configured in any suitable way so as to substantially confine optical signals propagating therein. In the exemplary embodiments disclosed herein, the optical waveguide is depicted as a planar optical waveguide (i.e., a slab or channel waveguide formed from layers of optical materials). However, embodiments employing other types of optical waveguides shall fall within the scope of the present disclosure or appended claims. One or more optical subunits can be assembled with the optical waveguide, with each optical subunit and the optical waveguide arranged for enabling coupling of optical signals therebetween.

Each optical subunit comprises an optical transmission element, a set of diffractive elements formed therein or thereon, and an optical component. The diffractive element set is positioned in or on the transmission element so as to enable at least partial spatial overlap of diffractive elements of the set and an evanescent portion of an optical signal propagating in the optical waveguide suitably positioned relative to the transmission element. The optical component is arranged to launch or to receive an optical signal propagating within the transmission element. The diffractive elements of the set are arranged so as to establish optical coupling between the optical signal propagating within the transmission element and the optical signal propagating in the optical waveguide. The diffractive elements of the set are arranged so that the optical signal propagating in the optical waveguide is successively incident on the diffractive elements of the set.

As illustrated schematically in FIG. 1, an optical signal with a modal field distribution 101 is shown propagating in a planar optical waveguide (comprising core 102 and cladding 103/104). The planar waveguide is shown in cross section and can represent either a channel waveguide (substantially confining optical signal 101 in two transverse dimensions) or a slab waveguide (substantially confining optical signal 101 in only one dimension). Two depressions 105 and 106 are formed in the cladding 104 by any suitable method (e.g., by spatially-selective etching of cladding 104). Each depression (which also may be referred to as a socket, receptacle, or other similar term) has received therein a corresponding optical subunit. In the exemplary embodiment of FIG. 1, the optical subunit received in socket 105 comprises optical transmission element 107, an optical detector 108, and a set of diffractive elements 113 formed on the transmission element 107, while the optical subunit received in socket 106 comprises optical transmission element 109, an optical source 111, and a set of diffractive elements 114 formed on the transmission element 109. The transmission elements 107 and 108 each comprise a volume of material substantially transparent at operationally relevant signal wavelengths (typically visible or infrared), examples of such material including but not limited to acrylics or other polymers, silica (doped or undoped), other dielectrics, semiconductors, and so on. The optical receiver 108 comprises a photodiode, an avalanche photodiode, a CCD or CMOS array detector, a photomultiplier, or other suitable optical receiver sensitive at operationally relevant wavelengths, and is arranged to receive an optical signal 115 propagating within transmission element 107. The optical source 109 comprises a laser, an LED, a fluorescent optical source, or other suitable optical source producing optical signals at operationally relevant wavelengths, and is arranged to launch an optical signal 116 to propagate within transmission element 109.

On or near the bottom of each transmission element 107 and 109 is formed the corresponding set of diffractive elements 113 and 114, respectively. Each of the diffractive element sets is positioned so as to enable at least partial spatial overlap of diffractive elements of the set and an evanescent portion of modal profile 101 of the optical signal propagating in the planar waveguide. Diffractive element set 113 is arranged so as to establish optical coupling between the optical signal propagating in the planar waveguide and the optical signal 115 (propagating within the transmission element 107 and received by optical detector 108). Optical coupling in this case indicates that at least a portion of the optical signal propagating in the planar waveguide is redirected by the diffractive element set 113 to propagate within the transmission element 107 as optical signal 115. Diffractive element set 114 is arranged so as to establish optical coupling between the optical signal 116 (launched by optical source 111 and propagating within the transmission element 109) and the optical signal propagating in the planar waveguide. Optical coupling in this case indicates that at least a portion of the optical signal launched by optical source 111 and propagating within the transmission element 100 as optical signal 116 is redirected by the diffractive element set 114 to propagate in the planar waveguide.

Either or both of the optical subunits can optionally further comprise an optical fiber, an additional planar optical waveguide, or one or more free-space optical component(s) (lenses, mirrors, prisms, filters, polarizers, waveplates, isolators, and so forth). Such additional elements can be arranged for receiving the optical signal 115 redirected by diffractive element set 113 and relaying the redirected optical signal to receiver 108. Such additional elements can be arranged for relaying an optical signal received from optical source 111 and launching it into transmission element 109 as optical signal 116.

The arrangements of the diffractive element sets 113 and 114 can be the same or can differ. Design and fabrication of the diffractive element sets employed for optical 11 coupling between the planar optical waveguide and the optical subunits typically proceeds according to the methods described in one or more of the incorporated references. For example, the arrangement of the diffractive element sets can be derived from computed interference of suitable simulated optical signal beams. The suitably processed computed interference pattern can written directly on or in the transmission element by photolithography and etching, or can be written onto another substrate that may be subsequently attached to the transmission element. The diffractive element set can instead be formed by stamping, nanoimprinting, casting, molding, injection molding, or other methods described in the incorporated references, or any other suitable spatially-selective material processing methods.

In the various exemplary embodiments disclosed herein, in some instances optical signals of only a single nominal operational wavelength are propagated in the optical waveguide, and the diffractive element sets of optical subunits assembled with the waveguide are substantially resonant with the nominal operational wavelength. In other instances, multiple optical signals having differing nominal operational wavelengths are propagated in the optical waveguide, and the diffractive element sets of optical subunits assembled with the optical waveguide are resonant with one or more of those operational wavelengths. Embodiments employing multiple nominal operational wavelengths can be used in a wavelength-division-multiplexing scheme, for example.

The diffractive elements of each set can be arranged to apply a transfer function between the coupled optical signals. In this way a diffractive element set can be arranged, for example, to interact preferentially with an incident optical signal having specified input spatial, spectral, or temporal properties to produce a redirected portion of the optical signal having specified output spatial, spectral, or temporal properties. This can be accomplished, for example, if the diffractive elements of the set are arranged collectively so as to exhibit a positional variation in amplitude, optical separation, or spatial phase over some portion of the set. The transfer function between the coupled optical signals is determined at least in part by the positional variation in amplitude, optical separation, or spatial phase exhibited by the diffractive elements of the set. Such arrangement of the diffractive elements to produce a desired transfer function is described in detail in various of the incorporated references.

In the various exemplary embodiments disclosed herein, in some instances the diffractive element set preferentially establishes optical coupling between the optical signal propagating in the transmission element and the optical signal propagating in only one selected direction in the optical waveguide. For example, in FIG. 1 the diffractive element set 113 is arranged so as to preferentially establish optical coupling between optical signal 101 (propagating from left to right in the optical waveguide) and optical signal 115 (propagating within transmission element 107 to optical detector 108). Such unidirectional optical coupling can be achieved, for example, with a diffractive element set having diffractive contours defined by interference of a simulated signal 101 and a simulated signal 115 propagating in a non-normal direction with respect to the planar waveguide. In contrast, the diffractive element set 114 is arranged so as to preferentially establish optical coupling between optical signal 116 (launched from optical source 111 and propagating within transmission element 109) and both of optical signals 117 and 118 (propagating in opposite directions in the optical waveguide). Such bidirectional optical coupling can be achieved, for example, by arranging the diffractive element set as a second-order grating, and can be advantageous under certain operating conditions, e.g., in a bidirectional optical bus architecture wherein communication is desired with optical subunits to both the left and right of a transmitter.

One functionality provided by the exemplary embodiments disclosed herein is the ability to couple optical signals between the optical waveguide (i.e., the motherboard or bus) and various optical subunits (i.e., daughter boards or cards) simply by positioning the subunits and waveguide in physical proximity. An analogy can be drawn to a scenario wherein electronically coupled daughter boards or cards are plugged into an electronic motherboard. This ability arises from the spatial overlap of the diffractive elements of the optical subunit and the evanescent portion of the optical signal propagating in the optical waveguide. Spatial overlap between the diffractive elements of an optical subunit and an optical signal propagating in an optical waveguide shall be defined operationally, i.e., the diffractive elements and optical signal shall be considered to overlap if an operationally acceptable degree of optical coupling results from the overlap. In some instances only a small level of coupling (e.g., a few percent) may be sufficient, for example to sample an optical signal to monitor its power. In other instances a large level of coupling may be needed or desired, for example when maximum optical power is needed for transmitting an optical signal over long distances. The level of coupling arising from a given overlap can be calculated by well-known or standard methods. Various arrangements for establishing said spatial overlap are illustrated schematically in FIGS. 2A-2D, which depict an optical signal 201 propagating in a planar waveguide comprising lower cladding 203, core 202, and (in FIGS. 2A, 2C, and 2D) upper cladding 204.

Figure 2A:
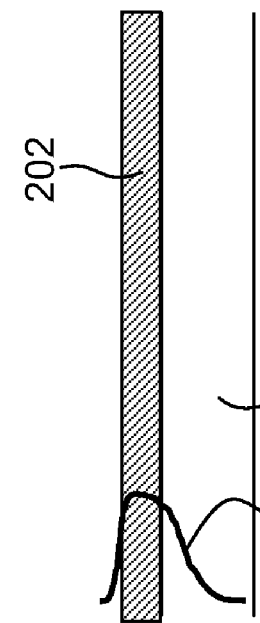
FIGS. 2A-2D illustrate schematically a planar optical waveguides arranged for assembly with an optical subunit.
Figure 2B:
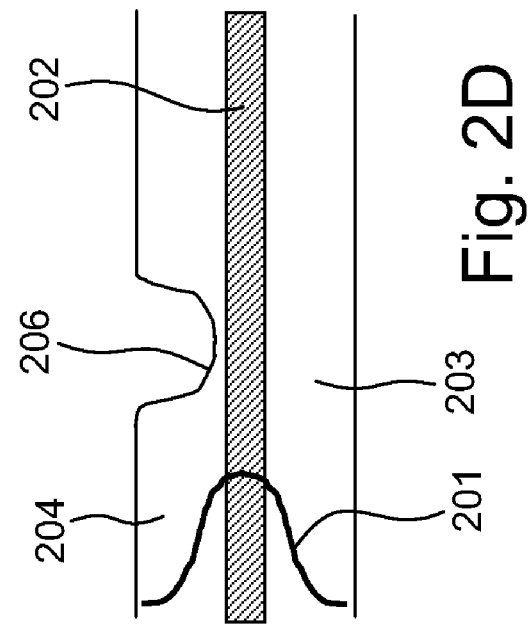

In FIGS. 2A and 2B a substantial portion of the modal field distribution of the optical signal 201 is exposed and physically accessible since the evanescent portion of the signal extends from the core 202 propagates in air. In FIG. 2A this is achieved by employing an upper waveguide cladding 204 that is significantly thinner than the transverse spatial extent of the modal field distribution that would result if cladding 204 were infinitely thick. As a result of the thin upper cladding 204, the evanescent portion of optical signal 201 extends beyond the upper cladding 204. Optical coupling to an optical subunit is achieved by positioning its diffractive element set so that the diffractive elements a least partly spatially overlap the evanescent portion of the optical signal 201 that extends beyond cladding 204. Optical coupling between an optical subunit and a planar waveguide is achieved in a similar manner in the exemplary arrangement of FIG. 2B, wherein the upper cladding 204 is missing. The waveguide core 203 is immediately adjacent to air (or other inert gas or vacuum), which functions as the upper waveguide cladding.

Figure 2C:
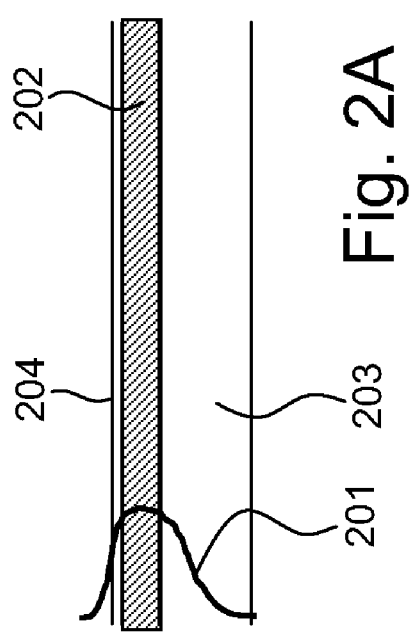

In FIG. 2C access to the evanescent portion of the optical signal 201 is provided via a depression, groove, socket, or similar modification 205 of the upper cladding 204 where all or part of the upper cladding is missing (not formed during upper cladding formation, or removed by etching or other suitable method). Optical coupling between the optical waveguide and the optical subunit is established by inserting the latter into the socket and positioning the subunit so that its diffractive elements spatially overlap the evanescent portion of optical signal 201 (analogous to the arrangement shown in FIG. 1 wherein optical subunits are inserted into sockets 105 and 106). In the arrangement of FIG. 2C, the upper cladding typically comprises a substantially rigid material. In contrast, in the arrangement of FIG. 2D the upper waveguide cladding 204 comprises a deformable material such as a polymer. In such an arrangement the modal field distribution of optical signal 201 is substantially contained within the upper cladding 204 when no optical subunit is present. The diffractive elements of an optical subunit are pressed into the deformable upper cladding 204 until deformation of the upper cladding allows spatial overlap of the diffractive elements and the evanescent portion of the optical signal 201. Depending on the material properties of the upper cladding 204, the resulting deformation may be elastic (reversing itself upon removal of the optical subunit) or plastic (remaining after removal of the optical subunit).

Figure 2D:
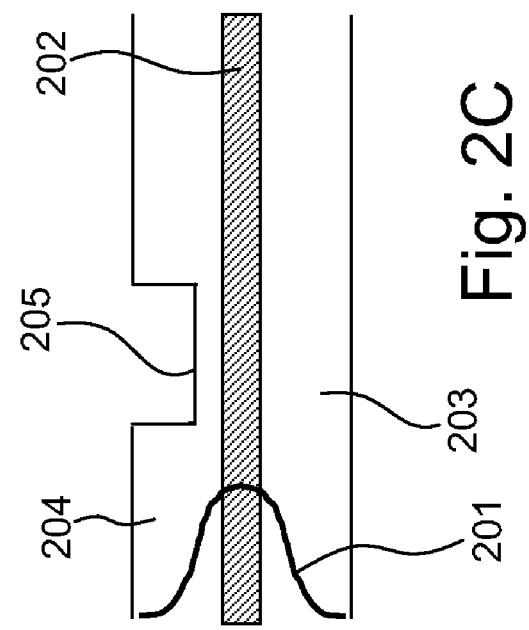

In the arrangements of FIGS. 2A, 2B, and 2D, there is no mechanical restriction on the placement of optical subunits on the optical waveguide. This enables greater flexibility in placement of optical subunits and a greater variety of assembled devices, but might necessitate vision-based or active alignment and assembly procedures for ensuring proper placement of the assembled subunits. In the arrangement of FIG. 2C, the sockets, grooves, depressions, or other similar structures can be arranged to provide an aid to mechanical alignment of an optical subunit received therein. This might enable passive or mechanical alignment and assembly procedures, but would necessarily limit the variety of positions available for the assembled subunits. In the arrangement of FIG. 2C, it may be desirable to fill the socket 205 with an index-matching medium if no optical subunit is to be coupled to the optical waveguide, to reduce unwanted scattering of the propagating optical signal 201 when it encounters the empty socket 205.

An alternative arrangement for establishing optical coupling between the optical waveguide and the optical subunit is illustrated schematically in FIGS. 3A and 3B, which depict an optical signal 301 propagating in a planar waveguide comprising core 302, lower cladding 303, and upper cladding 304. Received in socket 305 is an optical subunit comprising transmission element 307, diffractive elements 313, and optical component 309 (an optical detector in FIGS. 3A and 3B; an optical source or other optical component could be employed instead). The optical subunit is positioned so that there is negligible overlap between optical signal 301 and the diffractive element set 313, and consequently negligible optical coupling between the planar waveguide and the optical subunit, when there is air (or other inert gas or vacuum) between the planar waveguide and the diffractive element set 313 (as in FIG. 3A). A gel or liquid optical medium 320 is shown in FIG. 3B between the planar waveguide and the diffractive element set 313. The gel or liquid optical medium is chosen to have a refractive index sufficiently large to alter the spatial profile of the optical signal 301 as it propagates past socket 305 so that it overlaps the diffractive element set 313 sufficiently to provide optical coupling between the planar waveguide and the optical subunit. Removal of the gel or liquid optical medium 320 substantially eliminates the overlap and the optical coupling between the planar waveguide and the optical subunit.

FIG. 4 is a schematic top view of an exemplary planar waveguide 401 with several optical subunits 403 assembled therewith. Each optical subunit includes a transmission element, multiple optical components (e.g., optical sources or receivers), and multiple corresponding diffractive element sets 407. Each diffractive element set 407 is configured to provide optical coupling between the corresponding optical component and an optical signal 405 propagating in planar waveguide 401. The optical signals 405 can propagate each along a corresponding channel waveguide formed in planar waveguide 401, or the multiple optical signals 405 can comprise multiple signals propagating in a slab waveguide 401 (and which may or may not spatially overlap). In the latter case, the diffractive element sets can be arranged to launch optical signals into the slab waveguide to follow selected spatial beam paths within the slab waveguide, or to extract (or out-couple) optical signals propagating along selected spatial beam paths. Such spatial beams propagating within the slab waveguide 401 may be considered two-dimensional analogs to free-space optical beams. Such two-dimensional beams can assume any spatial wavefront permitted by diffraction theory, including converging, diverging, collimated, or other suitable or convenient wavefront.

The optical subunits 403 can be inserted into sockets or slots on planar waveguide 401 as described above (resembling the arrangement of FIG. 2C). If planar waveguide 401 is arranged in a manner similar to FIG. 2A, 2B, or 2D, sockets or slots might be unnecessary. If planar waveguide 401 is a slab waveguide, then the placement and arrangement of the diffractive element sets 407 would determine the spatial beam paths 405. Alternate optical bus configurations are possible. For example, one or more of the diffractive element sets 407 can be coupled to an optical source and arranged to launch a circular wave to propagate omnidirectionally (in two-dimensions) in slab optical waveguide 401. In other alternate embodiments the planar waveguide 401 can include additional diffractive element sets (not shown) for routing optical signals from one socket (or optical subunit) to another. This may be accomplished by use of so-called forward focusing or other diffractive structures disclosed in various of the incorporated references.

Figure 5:
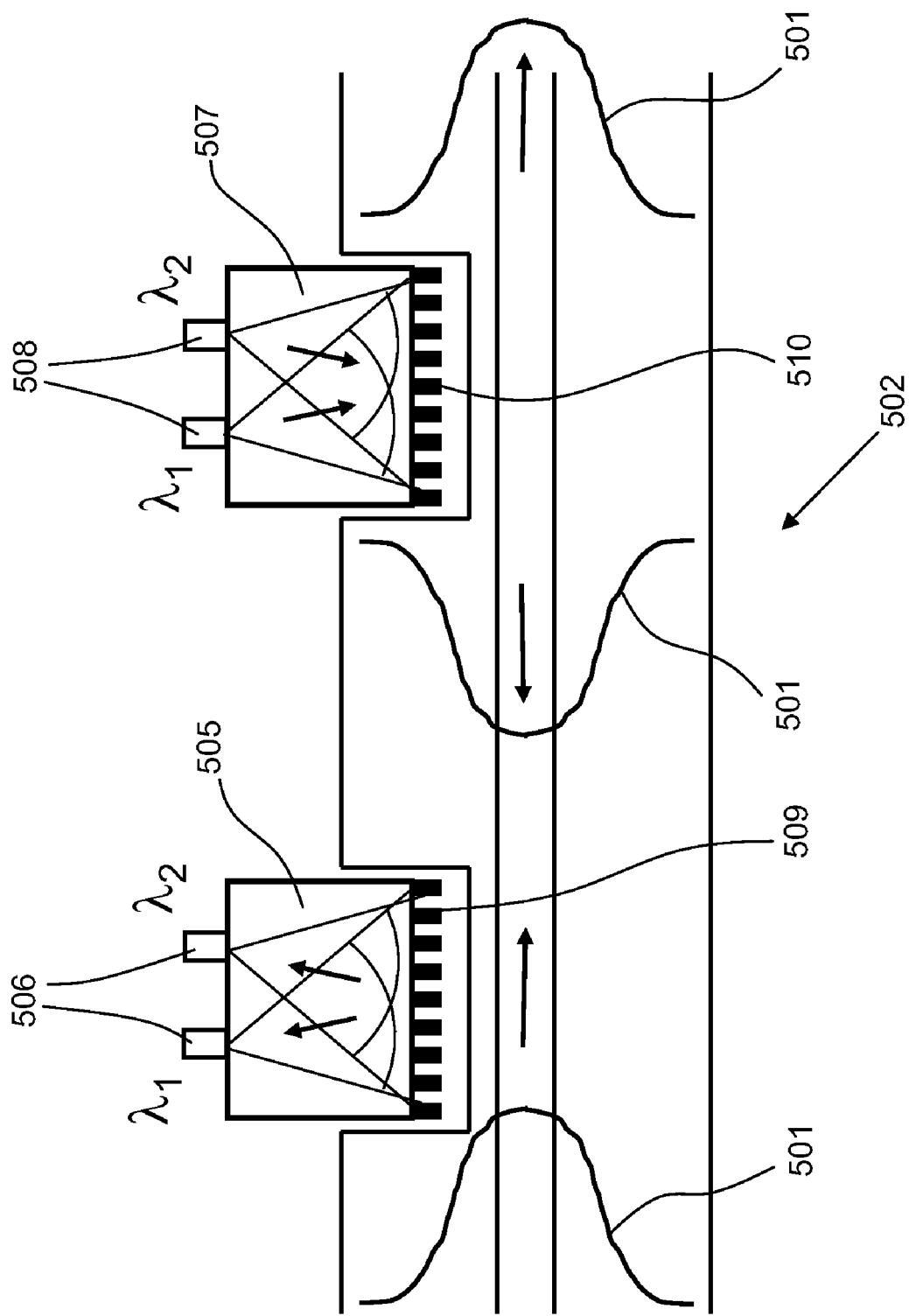
FIG. 5 illustrates schematically an optical waveguide and optical subunits assembled therewith.

FIG. 5 illustrates schematically an exemplary embodiment in which the planar waveguide 502 and optical subunits 505 and 507 assembled therewith are used for coupling multiple optical signals 501 at differing wavelengths. The depicted assembly includes multiple optical sources 508 coupled to planar waveguide 502 by diffractive elements 510 and multiple optical receivers coupled to planar waveguide 502 by diffractive elements 509, and can function in a manner similar to a wavelength-multiplexed optical communications network. Each receiver and transmitter of each optical subunit can have a dedicated set among the diffractive elements 509 or 510. In such a case, overlaid or interleaved sets of diffractive elements can be employed as described in various of the incorporated references. Alternatively, angular dispersion of a single diffractive element set can be exploited to couple multiple receivers or sources to the planar waveguide using only a single diffractive element set.

Although diverging beams are shown propagating within transmission elements from optical sources and converging beams are shown propagating within transmission elements toward optical receivers in the exemplary embodiments of FIGS. 1, 3A, 3B, and 5, it should be noted that beams of any spatial wavefront allowed by diffraction theory can be employed for an optical signal propagating within a transmission element of an optical subunit and coupled by a diffractive element set to an optical waveguide. For example, a collimated or even diverging beam can be employed for illuminating a large area optical detector with an optical signal coupled from the planar waveguide by a diffractive element set.

Figure 6:
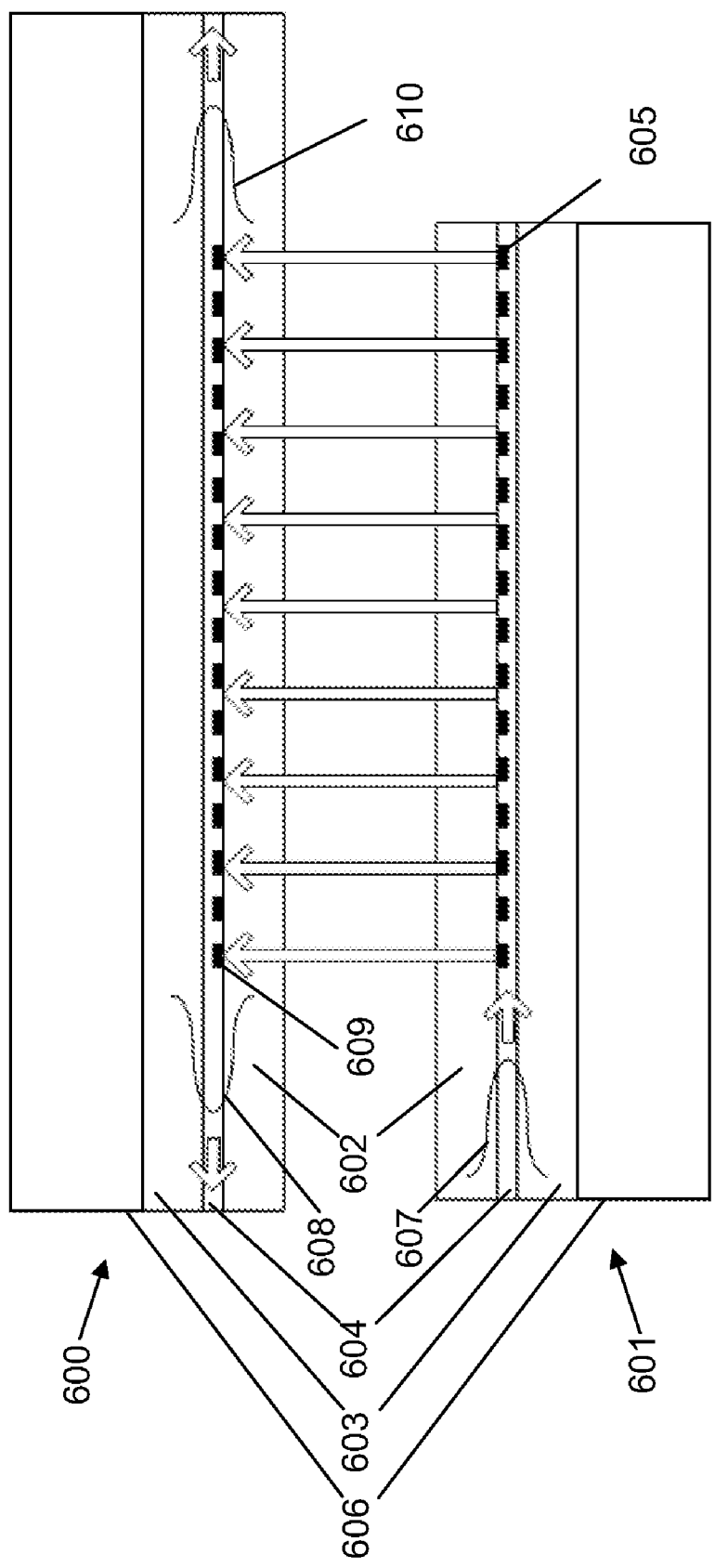
FIG. 6 illustrates schematically two optical waveguides coupled by respective diffractive element sets thereon.
Figure 7:
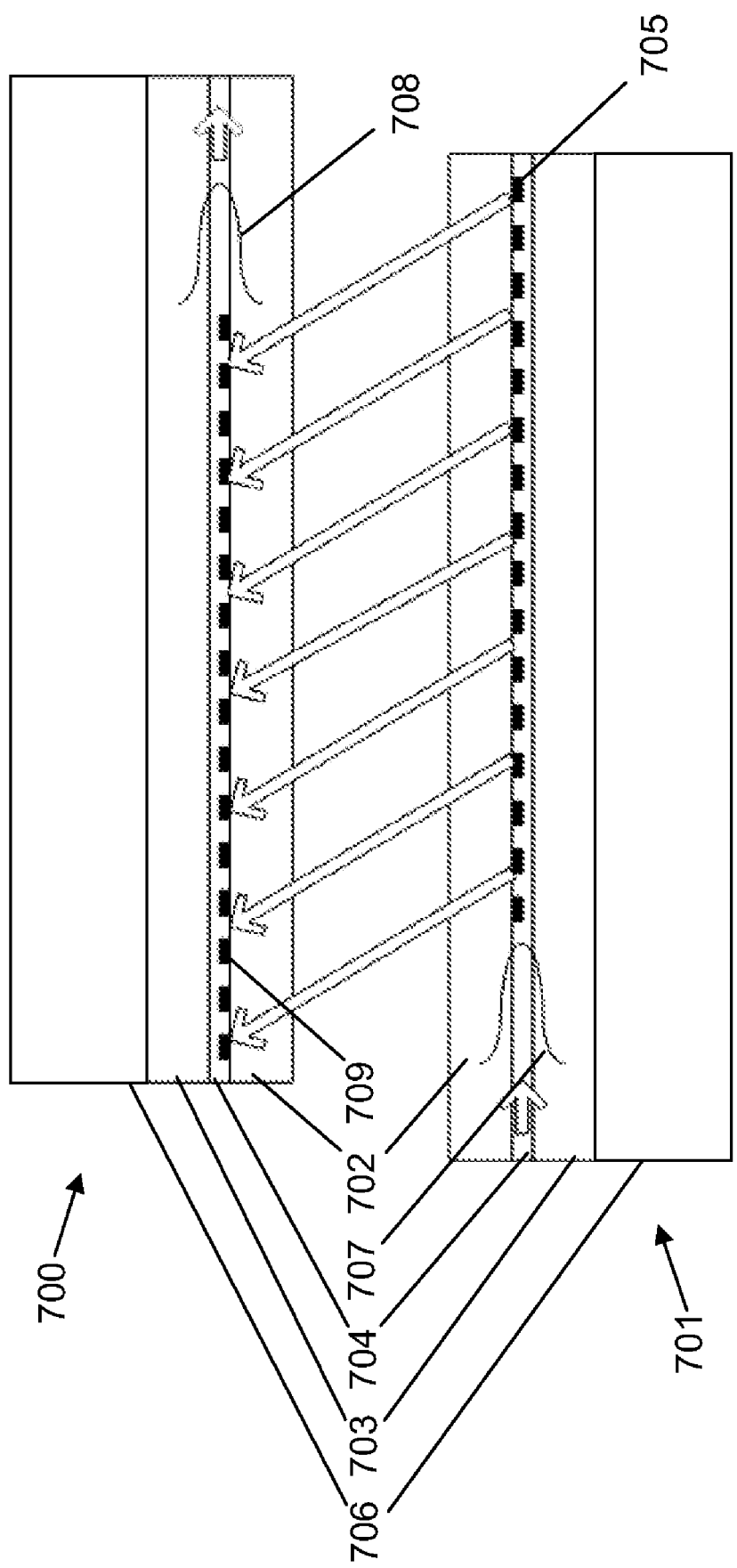
FIG. 7 illustrates schematically two optical waveguides coupled by respective diffractive element sets thereon.
Figure 8:
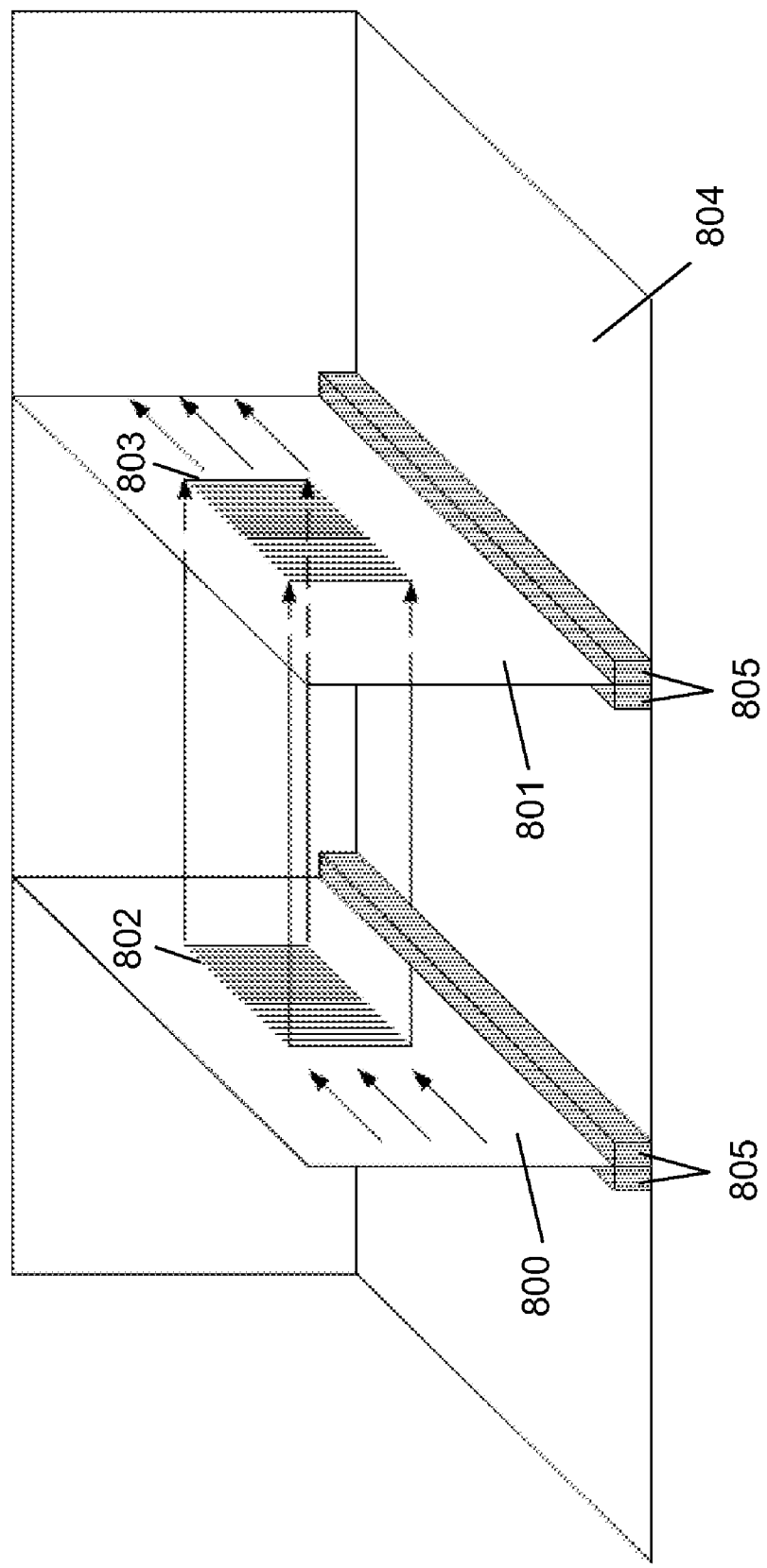
FIG. 8 illustrates schematically two optical waveguides coupled by respective diffractive element sets thereon.

An alternative arrangement for establishing optical coupling between an optical motherboard and an optical card (or between two optical motherboards or between two optical cards) is illustrated schematically in FIGS. 6, 7 and 8. In this arrangement, both the motherboard and the card have diffractive element sets, formed in or on a planar waveguide (channel or slab), configured to couple an optical signal propagating in the planar waveguide to an optical signal propagating out of the plane of the planar waveguide. To enable ready alignment yielding sufficiently efficient optical coupling between the boards (i.e. planar waveguides), it may be advantageous to configure the diffractive elements of each planar waveguide so that their respective out-of-plane coupling angles are about the same. Under such circumstances stacking the motherboard and the card will typically result in sufficiently efficient optical coupling within relative loose alignment tolerances.

In the exemplary embodiments of FIGS. 6, 7, and 8, the upper cladding of both planar waveguides (motherboard and card, or two motherboards) can be made arbitrarily thick since access to an evanescent portion of the optical signal propagating in the planar waveguides is not required. The out-of-plane coupled optical signal instead propagates through the upper claddings and through any space between the boards.

In some instances, it may be convenient to employ optical signal wavelengths and diffractive element sets that result in a diffractive order of two, i.e., the diffractive elements are spaced by one signal wavelength as measured in the corresponding planar waveguide. In that case an optical signal coupled into the planar waveguide propagates in two opposite directions within the waveguide, and the out-of-plane signal coupled out of the planar waveguide propagates substantially orthogonal to the planar waveguide.

For the case of a diffractive structure with straight-line diffractive contours that are equally spaced, the condition for second-order diffraction may be expressed as $$\lambda / n_{\it eff} = \Lambda \qquad (1)$$

where $n_{\it eff}$ is the effective refractive index of the waveguide and $\lambda$ is the free-space wavelength. If unidirectional coupling into a planar waveguide is desired to improve coupling efficiency, the in-medium wavelength $\lambda$ of the optical signal may be made less than the period of the diffractive elements $\Lambda$ but larger than half of the period of the diffractive elements, in other words $\Lambda$ may be chosen so as to satisfy $$\lambda/2 < \lambda / n_{\it eff} < \Lambda. \qquad (2)$$

The out-of-plane diffraction angle $\alpha$ between the normal to the planar waveguide and the propagation direction of the out-of-plane optical signal with effective refractive index $n_{\it eff\ out}$ may be calculated as $$\alpha = \arcsin\,[(1 - \lambda/(n_{\it eff} \Lambda)) \cdot n_{\it eff} / n_{\it eff\ out}] \qquad (3)$$

While second order diffractive structures are described explicitly herein, diffractive structures with various spacings can be employed to convert guided in-plane signals to out-of-plane signals. In some cases, larger spacings between diffractive elements enable generation of multiple out-of-plane signals which may be directed to multiple receivers. Such alternatives shall fall within the scope of the present disclosure or appended claims.

In FIG. 6, cross-sections of portions of optical motherboard 600 and optical card 601 are shown, each comprising upper cladding 602, lower cladding 603, core layer 604, and respective diffractive element sets 609 and 605. Substrates 606 may be used for mechanical robustness or for other purposes. An optical signal 607 propagates in card 601, is coupled substantially perpendicularly out of the card plane by the diffractive element set 605 (second order diffraction), and is coupled into the motherboard 600 via diffractive element set 609 to propagate as bidirectional optical signals 608 and 610 (second order diffraction). Alternative waveguide layer and diffractive element architectures can be employed, including those described in various of the incorporated references. Diffractive elements may be formed in a slab or channel waveguide, and if formed in a slab waveguide may have straight or curved contours. Waveguides 600 and 601 and corresponding diffractive element sets 609 and 605 may be substantially similar, or may differ. In the exemplary embodiment of FIG. 6, the periods $\Lambda_1$ and $\Lambda_2$ of the diffractive elements (if implemented as simple straight-line equally-spaced diffractive contours) typically satisfy Eq. (1) and the waveguides are substantially parallel to each other for optimal coupling.

In FIG. 7, cross-sections of optical motherboard 700 and optical card 701 are shown, each comprising upper cladding 702, lower cladding 703, core layer 704, and respective diffractive element sets 709 and 705. Substrate 706 may be used for mechanical robustness or other purposes. An optical signal 707 propagates in card 701, is coupled out of the card plane by the diffractive element set 705, and is coupled into the motherboard 700 via diffractive element set 709 to propagate as optical signal 708. Alternative waveguide layer and diffractive element architectures may be employed, including those described in various of the incorporated references. Diffractive elements may be formed in a slab or channel waveguide, and if formed in a slab waveguide may have straight or curved contours. Waveguides 700 and 701 and corresponding diffractive element sets 709 and 705 may be substantially similar, or may differ. In the exemplary embodiment of FIG. 7, the periods $\Lambda_1$ and $\Lambda_2$ of the diffractive elements (if implemented as simple straight-line equally-spaced diffractive contours) typically satisfy Eq. (2) and the waveguides may be substantially parallel to each other for optimal coupling.

The angle of the boards relative to coupled out-of-plane signal beams differ from than 90 degrees. Out-of-plane coupling angles may be calculated using Eq. (3) and the boards may be aligned to comply with the optimal angular alignment.

In the discussion of the embodiments of FIGS. 6 and 7, optical motherboard and optical card are interchangeable. In other words, optical signals can be coupled from the motherboard to the card or vice versa using the same diffractive element sets and geometries.

In FIG. 8 optical coupling between two optical motherboards 800 and 801 via respective diffractive element sets 802 and 803 is illustrated schematically. Only those portions of the motherboards needed for illustration of the optical coupling are shown. The motherboards can be mounted on a chassis 804 that provides for mechanical alignment between the motherboards using rails 805. Other suitable means for mechanical alignment can be employed. In this exemplary embodiment, each of the coupling diffractive element sets 802 and 803 is a second-order grating formed along substantially straight contours in a slab waveguide configured to couple an optical signal with a substantially flat phase front propagating in the slab waveguide. Lines of equal phase are substantially parallel to the contours and the contours on both boards are substantially parallel to one another. The planes of the motherboards are substantially parallel for optimal optical coupling. The optical signal with the substantially flat phase front can be produced from a convergent or divergent optical signal (for example from a laser diode or optical fiber) by other diffractive element sets (not shown), as described in various of the incorporated references. As a variation of the embodiment shown in FIG. 8, the diffractive element sets may comprise curved or variably spaced contours. As described in various of the incorporated references, such diffractive element sets can be employed to couple guided and non-guided signals having various wavefronts.

The maximal operationally acceptable distance between the motherboard and the card is determined by the divergence angle of the out-coupled beam, which is in turn determined by the dimensions and the focusing properties of the diffractive element set. For example, if the diffractive element set spans a length D across the waveguide in one direction, the divergence angle in this direction (measured in radians) can be made as small as approximately $\lambda/D$. The separation between boards may consequently be made as long (kilometer-scale) or as short (combined thickness of the upper claddings) as convenient provided that D is adjusted to a value large enough to prevent signal beams from expanding substantially beyond the size of the intended receivers or receiving diffractive element sets.

In order to improve the efficiency of the coupling into a particular direction, the diffractive elements may also be blazed or designed to have a ratio of element width to period favoring a given diffraction direction, as known in the art. Not all possible directions of optical signal propagation are exhibited in the exemplary embodiments shown in the Figures.

In the exemplary embodiments disclosed herein, specific dimensions and materials have been recited. It should be understood that use of such dimensions and materials is for illustrative purposes only and should not be construed as limiting the scope of the present disclosure or appended claims. Within the scope of the present disclosure or appended claims, a wide range of materials (including but not limited to metals, polymers, plastics, various glasses, and semi-conductor materials) may be employed for forming a planar waveguide, a transmission element, or diffractive elements. It should also be understood that the structure of diffractive elements in the exemplary embodiments is for illustrative purposes only, and that sets of diffractive elements of various topologies using any appropriate fabrication processes shall fall within the scope of the present disclosure or appended claims. Suitable fabrication processes for forming a diffractive element sets can include, but are not limited to, electroplating, stamping, ion exchange, lithographic scribing, photolithography (including projection photolithography), injection molding, embossing, spin-coating, injection molding, roll-pressing, UV-curing, laser or proton beam direct writing, or stamping. Projection lithography with a suitable scale factor change from mask to substrate (reduction, magnification, or unity) provides useful access to patterning tools with spatial resolution insufficient to directly render diffractive element sets on the transmission grating.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. For purposes of the present disclosure and appended claims, terms such as "comprising", "having", "including", and variants thereof are intended as open-ended terminology, and should be construed as if the phrase "at least one" appears after each instance thereof.

What is claimed is:

1. An optical apparatus comprising:
   an optical transmission element;
   a set of diffractive elements formed in or on the transmission element; and
   an optical component,
   wherein:
   the diffractive element set is positioned in or on the transmission element so as to enable at least partial spatial overlap of diffractive elements of the set and an evanescent portion of an optical signal propagating in an optical waveguide suitably positioned relative to the transmission element;
   the optical component is arranged to launch or to receive an optical signal propagating within the transmission element;
   the diffractive elements of the set are arranged so as to establish optical coupling between the optical signal propagating within the transmission element and the optical signal propagating in the suitably positioned optical waveguide; and
   the diffractive elements of the set are arranged so that the optical signal propagating in the suitably positioned optical waveguide is successively incident on the diffractive elements of the set.

2. The optical apparatus of claim 1 wherein the optical component comprises an optical source arranged relative to the transmission element so that the optical signal is launched by the optical source and propagates within the transmission element and at least a portion of the launched optical signal is redirected by the diffractive element set to propagate as the optical signal in the suitably positioned optical waveguide.

3. The optical apparatus of claim 2 wherein the optical source comprises a laser, an LED, or a fluorescent optical source.

4. The optical apparatus of claim 2 wherein the optical source includes an optical fiber, a planar optical waveguide, or a free-space optical component arranged for launching the optical signal to propagate within the transmission element.

5. The optical apparatus of claim 1 wherein the optical component comprises an optical detector arranged relative to the transmission element so as to receive at least a portion of the optical signal propagating in the suitably positioned optical waveguide and redirected by the diffractive element set to propagate within the transmission element.

6. The optical apparatus of claim 5 wherein the optical detector comprises a photodiode, an avalanche photodiode, a CCD or CMOS array detector, or a photomultiplier.

7. The optical apparatus of claim 5 wherein the optical detector includes an optical fiber, a planar optical waveguide, or a free-space optical component arranged for receiving the redirected optical signal propagating within the transmission element.

8. The optical apparatus of claim 1 wherein:
the diffractive elements of the set are arranged collectively so as to exhibit a positional variation in amplitude, optical separation, or spatial phase over some portion of the set; and
the diffractive elements of the set are arranged collectively so as to apply a transfer function between the coupled optical signals, the transfer function being determined at least in part by said positional variation in amplitude, optical separation, or spatial phase exhibited by the diffractive elements of the set.

9. The optical apparatus of claim 1 wherein the diffractive elements of the set are arranged so as to establish optical coupling between the optical signal propagating within the transmission element and the optical signal propagating in only one selected direction in the suitably positioned optical waveguide.

10. The optical apparatus of claim 1 wherein the diffractive elements of the set are arranged so as to establish optical coupling between the optical signal propagating within the transmission element and optical signals propagating in at least two corresponding selected directions in the suitably positioned optical waveguide.

11. The optical apparatus of claim 1 wherein the suitably positioned optical waveguide is a channel optical waveguide.

12. The optical apparatus of claim 1 wherein the suitably positioned optical waveguide is a slab optical waveguide.

13. The optical apparatus of claim 1 further comprising a second optical component, wherein the second optical component is arranged to launch or to receive a second optical signal propagating within the transmission element that is coupled by the diffractive element set to an optical signal propagating in the suitably positioned optical waveguide having an evanescent portion that at least partly spatially overlaps the diffractive element set.

14. The optical apparatus of claim 1 further comprising a second set of diffractive elements formed in or on the transmission element and a second optical component, wherein:
the second diffractive element set is positioned in or on the transmission element so as to enable at least partial spatial overlap of diffractive elements of the second set and an evanescent portion of an optical signal propagating in the suitably positioned optical waveguide;
the second optical component is arranged to launch or to receive a second optical signal propagating within the transmission element;
the diffractive elements of the second set are arranged so as to establish optical coupling between the second optical signal propagating within the transmission element and the optical signal propagating in the suitably positioned optical waveguide that at least partly spatially overlaps the second diffractive element set; and
the diffractive elements of the second set are arranged so that the optical signal propagating in the suitably positioned optical waveguide that at least partly spatially overlaps the second diffractive element set is successively incident on the diffractive elements of the second set.

15. The optical apparatus of claim 1 further comprising the optical waveguide arranged so as to provide the evanescent portion of the optical signal propagating therein and suitably positioned so as to enable at least partial spatial overlap of diffractive elements of the set and the evanescent portion of the optical signal propagating in the optical waveguide, wherein the optical waveguide and the transmission element comprise discrete, assembled subunits.

16. The optical apparatus of claim 15 further comprising:
a second optical transmission element;
a second set of diffractive elements formed in or on the second transmission element; and
a second optical component,
wherein:
the second transmission element is assembled with the optical waveguide;
the second diffractive element set is positioned in or on the second transmission element, and the second transmission element is positioned relative to the optical waveguide, so as to enable at least partial spatial overlap of diffractive elements of the second set and an evanescent portion of an optical signal propagating in the optical waveguide;
the second optical component is arranged to launch or to receive an optical signal propagating within the second transmission element;
the diffractive elements of the second set are arranged so as to establish optical coupling between the optical signal propagating within the second transmission element and the optical signal propagating in the optical waveguide;
the diffractive elements of the second set are arranged so that the optical signal propagating in the optical waveguide is successively incident on the diffractive elements of the second set; and
the optical waveguide and the second transmission element comprise discrete, assembled subunits.

17. The optical apparatus of claim 16 wherein:
the optical component comprises an optical source arranged relative to the transmission element so that the optical signal is launched by the optical source and propagates within the transmission element and at least a portion of the launched optical signal is redirected by the diffractive element set to propagate as the optical signal in the optical waveguide; and
the second optical component comprises an optical detector arranged relative to the second transmission element so as to receive at least a portion of the optical signal from the optical source propagating in the optical waveguide and redirected by the second diffractive element set to propagate within the second transmission element.

18. The optical apparatus of claim 15 wherein the optical waveguide comprises a core layer and a first cladding layer facing a first surface of the core layer, and the layers are arranged so that the evanescent portion of the propagating optical signal extends from a second surface of the core layer.

19. The optical apparatus of claim 18 wherein the optical waveguide further comprising a second cladding layer facing the second surface of the core layer so that the core layer is between the first and second cladding layers.

20. The optical apparatus of claim 19 wherein the second cladding layer has a substantially uniform thickness that is sufficiently small so that the evanescent portion of the propagating optical signal extends from the core layer beyond the second cladding layer.

21. The optical apparatus of claim 19 wherein the second cladding layer includes at least one areal region in which the second cladding layer is sufficiently thin or absent so that the evanescent portion of the propagating optical signal extends from the core layer beyond the second cladding layer, the second cladding layer being thicker outside the at least one areal region, the at least one areal region thereby forming a depression in the second cladding layer.

22. The optical apparatus of claim 21 wherein the second cladding layer comprises substantially rigid material.

23. The optical apparatus of claim 21 wherein the transmission element is positioned at least partly within the depression in the second cladding layer.

24. The optical apparatus of claim 23 wherein the second cladding layer comprises deformable material, and the transmission element forms the depression in the second cladding layer.

25. The optical apparatus of claim 24 wherein the second cladding layer comprises elastically deformable material.

26. The optical apparatus of claim 24 wherein the second cladding layer comprises plastically deformable material.

27. The optical apparatus of claim 15 further comprising a gel or liquid optical medium between the optical waveguide and the transmission element.

28. The optical apparatus of claim 27 wherein the optical waveguide and the transmission element are arranged and relatively positioned so as to enable the at least partial spatial overlap of the diffractive elements and the evanescent portion of the propagating optical signal in the presence of the gel or liquid optical medium, and so as to substantially eliminate the at least partial spatial overlap of the diffractive elements and the evanescent portion of the propagating optical signal in the absence of the gel or liquid optical medium.

29. The optical apparatus of claim 15 wherein the suitably positioned optical waveguide is a channel optical waveguide.

30. The optical apparatus of claim 15 wherein the suitably positioned optical waveguide is a slab optical waveguide.

31. A method for making an optical apparatus, the method comprising:
forming an optical transmission element;
forming in or on the transmission element a set of diffractive elements; and
forming an optical component,
wherein:
the diffractive element set is positioned in or on the transmission element so as to enable at least partial spatial overlap of diffractive elements of the set and an evanescent portion of an optical signal propagating in an optical waveguide suitably positioned relative to the transmission element;
the optical component is arranged to launch or receive an optical signal propagating within the transmission element;
the diffractive elements of the set are arranged so as to establish optical coupling between the optical signal propagating within the transmission element and the optical signal propagating in the suitably positioned optical waveguide; and
the diffractive elements of the set are arranged so that the optical signal propagating in the suitably positioned optical waveguide is successively incident on the diffractive elements of the set.

32. The method of claim 31 wherein the optical component comprises an optical source arranged relative to the transmission element so that the optical signal is launched by the optical source and propagates within the transmission element and at least a portion of the launched optical signal is redirected by the diffractive element set to propagate as the optical signal in the suitably positioned optical waveguide.

33. The method of claim 32 wherein the optical source comprises a laser, an LED, or a fluorescent optical source.

34. The method of claim 32 wherein the optical source includes an optical fiber, a planar optical waveguide, or a free-space optical component arranged for launching the optical signal to propagate within the transmission element.

35. The method of claim 31 wherein the optical component comprises an optical detector arranged relative to the transmission element so as to receive at least a portion of the optical signal propagating in the suitably positioned optical waveguide and redirected by the diffractive element set to propagate within the transmission element.

36. The method of claim 35 wherein the optical detector comprises a photodiode, an avalanche photodiode, a CCD or CMOS array detector, or a photomultiplier.

37. The method of claim 35 wherein the optical detector includes an optical fiber, a planar optical waveguide, or a free-space optical component arranged for receiving the redirected optical signal propagating within the transmission element.

38. The method of claim 31 wherein:
the diffractive elements of the set are arranged collectively so as to exhibit a positional variation in amplitude, optical separation, or spatial phase over some portion of the set; and
the diffractive elements of the set are arranged collectively so as to apply a transfer function between the coupled optical signals, the transfer function being determined at least in part by said positional variation in amplitude, optical separation, or spatial phase exhibited by the diffractive elements of the set.

39. The method of claim 31 wherein the diffractive elements of the set are arranged so as to establish optical coupling between the optical signal propagating within the transmission element and the optical signal propagating in only one selected direction in the suitably positioned optical waveguide.

40. The method of claim 31 wherein the diffractive elements of the set are arranged so as to establish optical coupling between the optical signal propagating within the transmission element and optical signals propagating in at least two corresponding selected directions in the suitably positioned optical waveguide.

41. The method of claim 31 wherein the suitably positioned optical waveguide is a channel optical waveguide.

42. The method of claim 31 wherein the suitably positioned optical waveguide is a slab optical waveguide.

43. The method of claim 31 further comprising forming a second optical component, wherein the second optical component is arranged to launch or to receive a second optical signal propagating within the transmission element that is coupled by the diffractive element set to an optical signal propagating in the suitably positioned optical waveguide having an evanescent portion that at least partly spatially overlaps the diffractive element set.

44. The method of claim 31 further comprising forming a second set of diffractive elements in or on the transmission element and forming a second optical component, wherein:
the second diffractive element set is positioned in or on the transmission element so as to enable at least partial spatial overlap of diffractive elements of the second set and an evanescent portion of an optical signal propagating in the suitably positioned optical waveguide;
the second optical component is arranged to launch or to receive a second optical signal propagating within the transmission element;
the diffractive elements of the second set are arranged so as to establish optical coupling between the second optical signal propagating within the transmission element and the optical signal propagating in the suitably positioned optical waveguide that at least partly spatially overlaps the second diffractive element set; and
the diffractive elements of the second set are arranged so that the optical signal propagating in the suitably positioned optical waveguide that at least partly spatially overlaps the second diffractive element set is successively incident on the diffractive elements of the second set.

45. The method of claim 31 further comprising:
forming an optical waveguide arranged so as to provide the evanescent portion of the optical signal propagating therein; and
assembling with the transmission element the optical waveguide suitably positioned so as to enable at least partial spatial overlap of diffractive elements of the set and the evanescent portion of the optical signal propagating in the planar optical waveguide,
wherein the optical waveguide and the transmission element comprise discrete subunits.

46. The method of claim 45 further comprising removing the optical subunit from the optical waveguide.

47. The method of claim 45 further comprising:
forming a second optical transmission element;
forming in or on the second transmission element a second set of diffractive elements;
forming a second optical component; and
assembling the second transmission element with the optical waveguide,
wherein:
the second diffractive element set is positioned in or on the second transmission element, and the second transmission element is positioned relative to the optical waveguide, so as to enable at least partial spatial overlap of diffractive elements of the second set and an evanescent portion of an optical signal propagating in the optical waveguide;
the second optical component is arranged to launch or to receive an optical signal propagating within the second transmission element;
the diffractive elements of the second set are arranged so as to establish optical coupling between the optical signal propagating within the second transmission element and the optical signal propagating in the optical waveguide; and the diffractive elements of the second set are arranged so that the optical signal propagating in the optical waveguide is successively incident on the diffractive elements of the second set.

48. The method of claim 47 wherein:
the optical component comprises an optical source arranged relative to the transmission element so that the optical signal is launched by the optical source and propagates within the transmission element and at least a portion of the launched optical signal is redirected by the diffractive element set to propagate as the optical signal in the optical waveguide; and
the second optical component comprises an optical detector arranged relative to the second transmission element so as to receive at least a portion of the optical signal from the optical source propagating in the optical waveguide and redirected by the second diffractive element set to propagate within the second transmission element.

49. The method of claim 45 wherein the optical waveguide comprises a core layer and a first cladding layer facing a first surface of the core layer, and the layers are arranged so that the evanescent portion of the propagating optical signal extends from a second surface of the core layer.

50. The method of claim 49 further comprising a second cladding layer facing the second surface of the core layer so that the core layer is between the first and second cladding layers.

51. The method of claim 50 wherein the second cladding layer has a substantially uniform thickness that is sufficiently small so that the evanescent portion of the propagating optical signal extends from the core layer beyond the second cladding layer.

52. The method of claim 50 wherein the second cladding layer includes at least one areal region in which the second cladding layer is sufficiently thin or absent so that the evanescent portion of the propagating optical signal extends from the core layer beyond the second cladding layer, the second cladding layer being thicker outside the at least one areal region, the at least one areal region thereby forming a depression in the second cladding layer.

53. The method of claim 52 wherein the second cladding layer comprises substantially rigid material.

54. The method of claim 52 further comprising removing material from the second cladding layer to form the depression therein.

55. The method of claim 52 wherein the transmission element is positioned at least partly within the depression in the second cladding layer.

56. The method of claim 55 wherein the second cladding layer comprises deformable material, the method further comprising forming the depression by inserting the transmission element into the deformable second cladding layer.

57. The method of claim 56 wherein the second cladding layer comprises elastically deformable material.

58. The method of claim 56 wherein the second cladding layer comprises plastically deformable material.

59. The method of claim 45 further comprising placing a gel or liquid optical medium between the optical waveguide and the transmission element.

60. The method of claim 59 wherein the optical waveguide and the transmission element are arranged and relatively positioned so as to enable the at least partial spatial overlap of the diffractive elements and the evanescent portion of the propagating optical signal in the presence of the gel or liquid optical medium, and so as to substantially eliminate the at least partial spatial overlap of the diffractive elements and the evanescent portion of the propagating optical signal in the absence of the gel or liquid optical medium.

61. The method of claim 60 further comprising removing the gel or liquid optical medium from between the optical waveguide and the transmission element, thereby substantially eliminating the at least partial spatial overlap of the diffractive elements and the evanescent portion of the propagating optical signal.

62. The method of claim 45 wherein the suitably positioned optical waveguide is a channel optical waveguide.

63. The method of claim 45 wherein the suitably positioned optical waveguide is a slab optical waveguide.

* * * * *